United States Patent
Deixler et al.

(10) Patent No.: US 12,553,988 B2
(45) Date of Patent: Feb. 17, 2026

(54) CONTROL DEVICE FOR RECONFIGURING A RADIOFREQUENCY-BASED SENSING SYSTEM AND A METHOD THEREOF

(71) Applicant: SIGNIFY HOLDING B.V., Eindhoven (NL)

(72) Inventors: Peter Deixler, Arlington, MA (US); Hugo José Krajnc, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 274 days.

(21) Appl. No.: 18/562,435

(22) PCT Filed: May 12, 2022

(86) PCT No.: PCT/EP2022/062907
§ 371 (c)(1),
(2) Date: Nov. 20, 2023

(87) PCT Pub. No.: WO2022/243152
PCT Pub. Date: Nov. 24, 2022

(65) Prior Publication Data
US 2024/0248166 A1    Jul. 25, 2024

Related U.S. Application Data

(60) Provisional application No. 63/191,365, filed on May 21, 2021.

(30) Foreign Application Priority Data

May 27, 2021  (EP) ..................... 21176112

(51) Int. Cl.
*G01S 7/00*     (2006.01)
*G01S 13/00*    (2006.01)
*G01S 13/56*    (2006.01)

(52) U.S. Cl.
CPC ............ *G01S 7/006* (2013.01); *G01S 13/003* (2013.01); *G01S 13/56* (2013.01)

(58) Field of Classification Search
CPC ......... G01S 7/006; G01S 13/003; G01S 13/56
(Continued)

(56) References Cited

U.S. PATENT DOCUMENTS 6,124,823 A  *  9/2000  Tokoro ................. G01S 13/931
                                                342/128
9,459,125 B2 * 10/2016  Wilson .................. G01D 21/00
(Continued)

FOREIGN PATENT DOCUMENTS

EP    1224641 B1 *  5/2003   ........... G08B 17/107
EP    3107382 B1 * 12/2020   ............. G01S 17/04
(Continued)

OTHER PUBLICATIONS

Zhang, Fusang et al., "Exploring LORA for Long-Range Through-Wall Sensing," HAL Open Science, Proceedings of the ACM on Interactive Mobile, Wearable and Ubiquitous Technologies, 2020, https://hal.science/hal-03363358 (28 Pages).
(Continued)

*Primary Examiner* — Nuzhat Pervin

(57) ABSTRACT

A method of reconfiguring a radiofrequency-based sensing system comprising at least two nodes, wherein the at least two nodes are arranged for transmitting and/or receiving a radiofrequency signal for presence and/or location detection and for performing network communication in an environment; wherein the method comprises the steps of: obtaining a signal indicative of a level of accumulation of radiofrequency transmission affecting elements in proximity of at least one of the at least two nodes; determining whether the level of accumulation exceeds a threshold; and wherein if the level of accumulation exceeds the threshold; determin-
(Continued)

ing, based on the obtained signal, which one of the at least two nodes to act as a transmitter to transmit the radiofrequency signal for presence and/or location detection and which one of the at least two nodes to act as a receiver to receive the transmitted radiofrequency signal for presence and/or location detection, and instructing the determined one of the at least two nodes to act as a transmitter and the determined one of the at least two nodes to act as a receiver.

15 Claims, 6 Drawing Sheets

(58) Field of Classification Search
   USPC .......................................................... 342/58
   See application file for complete search history.

(56) References Cited

U.S. PATENT DOCUMENTS

| | | | | |
|---|---|---|---|---|
| 9,826,598 | B2* | 11/2017 | Roberts | H04L 63/0876 |
| 10,371,792 | B2* | 8/2019 | Rakeman | G01S 13/42 |
| 10,701,531 | B2* | 6/2020 | Agrawal | H04W 4/80 |
| 10,991,230 | B2* | 4/2021 | Triventi | G08B 25/08 |
| 11,009,598 | B2* | 5/2021 | Dobrev | G01S 13/87 |
| 11,307,301 | B2* | 4/2022 | Yeh | G01S 13/88 |
| 2004/0208591 | A1* | 10/2004 | Willebrand | H04B 10/1123 |
| | | | | 398/115 |
| 2016/0311388 | A1* | 10/2016 | Diewald | B60R 21/01534 |
| 2018/0059213 | A1* | 3/2018 | Wallstedt | G01S 7/021 |
| 2018/0106888 | A1* | 4/2018 | Heuel | G01S 13/34 |
| 2018/0128901 | A1* | 5/2018 | Pointer | G01S 13/04 |
| 2018/0313946 | A1* | 11/2018 | Al-Alusi | G01S 7/03 |
| 2019/0052995 | A1* | 2/2019 | Agrawal | H04B 17/30 |
| 2019/0273540 | A1* | 9/2019 | Cronie | H04W 16/28 |
| 2020/0187126 | A1* | 6/2020 | Bolin | G01S 7/021 |
| 2020/0280826 | A1* | 9/2020 | Agrawal | H04W 4/80 |
| 2021/0003693 | A1* | 1/2021 | Jales | G01S 15/52 |
| 2021/0181330 | A1* | 6/2021 | Hong | G01S 13/42 |
| 2022/0043112 | A1* | 2/2022 | Stokes | G01S 7/10 |
| 2022/0099820 | A1* | 3/2022 | Hong | G01S 7/354 |
| 2023/0184923 | A1* | 6/2023 | Jales | G05D 1/43 |
| 2024/0061078 | A1* | 2/2024 | Gulden | G01S 13/931 |

FOREIGN PATENT DOCUMENTS

| | | | | |
|---|---|---|---|---|
| WO | WO-2007077062 A1 * | 7/2007 | ............ | G01S 7/036 |
| WO | 2020043592 A1 | 3/2020 | | |
| WO | WO-2021089345 A1 * | 5/2021 | ............ | G01S 13/56 |
| WO | 2022058244 A1 | 3/2022 | | |
| WO | 2022090037 A1 | 5/2022 | | |
| WO | 2022175190 A2 | 8/2022 | | |

OTHER PUBLICATIONS

Savage, Nick et al., "Radio Wave Propagation Through Vegetation: Factors Influencing Signal Attenuation," Radio Science, vol. 38, No. 5, 2003 (14 Pages).

* cited by examiner

300

400

CONTROL DEVICE FOR RECONFIGURING A RADIOFREQUENCY-BASED SENSING SYSTEM AND A METHOD THEREOF

CROSS-REFERENCE TO PRIOR APPLICATIONS

This application is the U.S. National Phase application under 35 U.S.C. § 371 of International Application No. PCT/EP2022/062907, filed on May 12, 2022, which claims the benefit of U.S. Provisional Patent Application No. 63/191,365, filed on May 21, 2021 and European Patent Application Ser. No. 21/176,112.7, filed on May 27, 2021. These applications are hereby incorporated by reference herein.

FIELD OF THE INVENTION

The invention relates to a method of reconfiguring a radiofrequency-based sensing system. The invention further relates to a control device, a system and a computer program for reconfiguring a radiofrequency-based sensing system.

BACKGROUND

Radiofrequency based sensing is a sensing mechanism involving wireless transceivers (or transmitters/receivers) arranged for transmitting and receiving radiofrequency signals for radio communication. The radiofrequency signals used for radio communication, when passing through a sensing volume, are affected by movement of a person within the sensing volume e.g., via reflection, absorption, etc. of the radiofrequency signals. The radiofrequency-based sensing uses such deviations of radiofrequency signals to infer presence of the person. Other applications of the radiofrequency-based sensing may involve location detection, fall detection, gesture detection etc. which are also based on how radiofrequency signals are affected in the sensing volume. Since a radiofrequency sensing system relies on radiofrequency signals the quality of transmission/reception of the radiofrequency signals are critical to obtain optimal radiofrequency-based sensing performance.

WO 2021/089345 A1 discloses a pair-assignment device (100) comprising a sensing-node position ascertainment unit (102) configured to ascertain position information (P.I.) pertaining to respective positions of external RF-sensing nodes (104, 106) with respect to a predefined sensing volume (108) of a RF context-sensing arrangement and a pair-assigning unit (110) configured to assign, using the ascertained position information, at least one transmitter-receiver pair among the individual RF-sensing nodes of the RF context-sensing arrangement to perform a RF context-sensing function, to assign to the RF sensing nodes of the given transmitter-receiver pair a transmitter role (Tx) and a receiver role (Rx), respectively.

SUMMARY OF THE INVENTION

The inventors have realized that the quality of radiofrequency signals, and thereof the quality of the radiofrequency-based sensing, is impacted by the presence of substances in proximity of the wireless transceivers which adversely affect the propagation of radiofrequency signals.

It is therefore an objective of the present invention to improve radiofrequency-based sensing mechanism even in the presence of elements which adversely affect the propagation of radiofrequency signals.

According to a first aspect, the objective is achieved by a method of reconfiguring a radiofrequency-based sensing system comprising at least two nodes, wherein the at least two nodes are arranged for transmitting and/or receiving a radiofrequency signal for presence and/or location detection and for performing network communication in an environment; wherein the method comprises the steps of obtaining a signal indicative of a level of accumulation of radiofrequency transmission affecting elements in proximity of at least one of the at least two nodes; determining whether the level of accumulation exceeds a threshold; and wherein if the level of accumulation exceeds the threshold; determining, based on the obtained signal, which one of the at least two nodes to act as a transmitter to transmit the radiofrequency signal for presence and/or location detection and which one of the at least two nodes to act as a receiver to receive the transmitted radiofrequency signal for presence and/or location detection, and instructing the determined one of the at least two nodes to act as a transmitter and the determined one of the at least two nodes to act as a receiver.

The method for reconfiguring a radiofrequency-based sensing system comprises at least two nodes. The radiofrequency-based sensing system may comprise three nodes or any n number of nodes, wherein n>1. The configuration of the radiofrequency-based sensing system may involve setting up or (re)adjusting parameters of the radiofrequency-based sensing system which affects the performance of the radiofrequency-based sensing system.

The at least two nodes are arranged for transmitting and/or receiving a radiofrequency signal for presence and/or location detection and for performing network communication in an environment. In such an arrangement, one node may be arranged for transmitting the radiofrequency signal and the other node may be arranged for receiving the transmitted radiofrequency signal. In an example, when the number of nodes is three, one node may be arranged for transmitting the radiofrequency signal and the other two nodes may be arranged for receiving the transmitted radiofrequency signal. Any other number of nodes and the possible combination of transmitter/receiver may also be envisioned, which for instance, may be based on the radiofrequency-based sensing application, spatial location of the nodes etc. The radiofrequency-based sensing system may be arranged for presence and/or location detection. Presence sensing may comprise vital sign detection, gesture detection etc. Additionally, and/or alternatively, other known or future applications of radiofrequency-based sensing systems (e.g., breathing detection, activity detection, vital sign detection, gesture detection etc.) are not excluded.

The transmitted/received radiofrequency signals may be used for presence and/or location detection and for performing network communication. The network communication may comprise a wireless communication protocol of any suitable type, including for example Bluetooth, ZigBee, UWB or WiFi, with the nodes having appropriate corresponding circuitry for the protocol. The radiofrequency-based sensing and (wireless) network communication is performed in an environment. The environment may be an outdoor space such as a garden, a balcony, a park, a street etc. The environment may be an indoor space such as an animal barn, a warehouse, a manufacturing site etc.

The method may comprise obtaining a signal indicative of a level of accumulation of the radiofrequency transmission affecting elements in proximity of at least one of the at least two nodes. The obtained signal may be indicative of a current level of accumulation and/or a predicted level of accumulation. A radiofrequency transmission affecting element may comprise a substance/material which adversely affects the propagation of radiofrequency signals. The examples of the radiofrequency transmission affecting elements may comprise mud, dust, debris, (dry/wet/dead) leaves, dirt, organic matter (e.g. moss, root structure, dead insects), bird droppings, snow, rainwater, sand etc. The example may further include condensed-water top layer or ice top layer. A combination of different radiofrequency transmission affecting elements may also be considered. The radiofrequency transmission affecting elements may accumulate either rapidly (e.g., snow, condensation) or accumulate slowly over a prolonged period of time.

The term proximity should be understood as a distance which is sufficiently close to the node such that the propagation of the radiofrequency signal is adversely affected by the radiofrequency transmission affecting elements. For example, the radiofrequency transmission affecting elements may be accumulated on the (mechanical) surface of the at least one of the at least two nodes. The surface may comprise an optical surface. The elements may only accumulate on a first portion of the mechanical surface of the node, while a second portion has no accumulated elements. Additionally, and/or alternatively, the radiofrequency transmission affecting elements may be accumulated in an immediate vicinity of the node. The signal may be indicative of a level of accumulation of radiofrequency transmission affecting elements in proximity of at least one node or of each of the at least two nodes.

The method may further comprise determining whether the level of accumulation exceeds a threshold. The selection of threshold may be based on a predetermined criterion related to an optimal performance of the radiofrequency-based sensing system. The threshold may be chosen by a user or selected automatically by the radiofrequency-based sensing system based on the optimal performance of the radiofrequency-based sensing system, for instance when the false positives or false negatives increases to an undesired level. Different thresholds may be selected for different sensing tasks at hand (e.g. motion detection, true occupancy detection, breathing detection).

The method may further comprise if the level of accumulation exceeds the threshold; determining, based on the obtained signal, which one of the at least two nodes to act as a transmitter to transmit the radiofrequency signal for presence and/or location detection and which one of the at least two nodes to act as a receiver to receive the transmitted radiofrequency signal for presence and/or location detection. When the level of accumulation exceeds the threshold or in other words when the performance of the radiofrequency-based sensing system is not optimal, the method may further comprise determining which one of the at least two nodes to act as a transmitter for presence and/or location detection and which one of the at least two nodes to act as a receiver for presence and/or location detection. Since, the method further comprises instructing the determined one of the at least two nodes to act as a transmitter and the determined one of the at least two nodes to act as a receiver, an improved radiofrequency-based sensing mechanism even in presence of elements which negatively affects the propagation of the radiofrequency signals is obtained. In an example, the node with the highest level of accumulation or with a level of accumulation exceeding the threshold is determined to act as a receiver node.

In an embodiment, the obtained signal may be further indicative of a type of the radiofrequency transmission affecting element, and wherein the method may further comprise selecting the threshold based on the type of the radiofrequency transmission affecting element.

The type of the radiofrequency transmission affecting element may comprise distinguishing between different substances/materials affecting radiofrequency transmission. Since the method may further comprise selecting the threshold based on the type of the radiofrequency transmission affecting element, a further improved radiofrequency-based sensing mechanism is obtained which advantageously adapt the threshold based on the type of the radiofrequency transmission affecting element. For example, wet snow accumulated in proximity to a node has a stronger effect on radiofrequency signal transmission compared to an accumulation of dry leaves. Therefore, the method advantageously adapts the threshold accordingly, for instance, a smaller accumulation of wet snow will deteriorate radiofrequency-based sensing system and is sufficient to reconfigure the radiofrequency-based sensing system compared to a smaller accumulation of dry leaves. The obtained signal may comprise information indicative of the current type of the radiofrequency transmission affecting element or a predicted or an expected type of the radiofrequency transmission affecting element.

In an embodiment, the at least two nodes may comprise a first node and a second node, and wherein the obtained signal may be indicative of the level of accumulation and/or a type of the radiofrequency transmission affecting element in proximity of the first node and the second node; and wherein the method may further comprise comparing the level of accumulation of the radiofrequency transmission affecting elements in proximity of the first and the second node, determining and instructing the first node to act as a receiver to receive the transmitted radiofrequency signal for presence and/or location detection if the level of accumulation for the first node is higher compared to the second node; and/or determining and instructing which one to act as a transmitter and/or receiver for presence and/or location detection based on the type of the radiofrequency transmission affecting element.

This embodiment is based on the inventor's insight that the accumulation of the radiofrequency transmission affecting elements in proximity of the radiofrequency sensing transmitter node of a radiofrequency-based sensing system will have a stronger effect on how the wireless multipath distributes across a space compared to if the same amount of the radiofrequency transmission affecting element is located at the radiofrequency sensing receiver node of the radiofrequency-based sensing system. If the radiofrequency transmission affecting element is at the transmitter node, almost all wireless radiofrequency sensing energy will hit the radiofrequency transmission affecting element resulting in a significant portion of the overall transmitted radio signal being deflected/reflected/absorbed by the radiofrequency transmission affecting element. For example, these elements are usually not uniformly distributed across the node surface. Hence, a node of dirt covering only a portion the node, different wireless multipath will be blocked in the to-be-monitored environment space when the dirty node is used as transmitter node compared to when it used as receiver node.

Similarly, the type of radiofrequency transmission affecting element is also crucial for the propagation of the radiofrequency signal. In this case, as discussed above, a smaller amount of wet snow may still adversely affect the radiofrequency signal transmission compared to larger amounts of dry leaves. Therefore, the method is advantageously adapted to determine and instruct which one to act as a transmitter and/or receiver for presence and/or location detection based on the type of the radiofrequency transmission affecting element. For example, a node with wet snow may be instructed to act as a receiver node compared to a node with dry leaves which may be instructed to act as a transmitter node for presence and/or location detection.

In an embodiment, the method may further comprise reconfiguring the radiofrequency-based sensing system dynamically over time.

The radiofrequency transmission affecting element may be accumulated over time. For example, in a rainy season, mud, dirt, wet leaves may accumulate in proximity of the nodes over time therefore reconfiguring may be required dynamically over time. Alternatively, rain may also clean the node and therefore the accumulation of the radiofrequency transmission affecting element may be changed (reduced) due to rain. For instance a layer of Sahara sand may be deposited by a first light rain, while the sand may be washed away by a thunderstorm with torrential rain. The method may advantageously dynamically reconfigure the radiofrequency-based sensing system to further improve the radiofrequency-based sensing system.

In an embodiment, the method may further comprise inferring a level of accumulation of the radiofrequency transmission affecting elements in proximity of the at least one of the at least two nodes and/or a type of the radiofrequency transmission affecting elements based on one or more of weather forecast, season of the year, type of the node, location of the node in the environment, real-time optical sensor image of a representative surface, the thermal self-heating profile of the light, the audio sound propagation, a VOC sensor reading, a structured light sensor, and determining, based on the inferred level of accumulation of the radiofrequency transmission affecting elements and/or on the inferred type of the radiofrequency transmission affecting element, which one of the at least two nodes to act as a transmitter to transmit the radiofrequency signal for presence and/or location detection and which one of the at least two nodes to act as a receiver to receive the transmitted radiofrequency signal for presence and/or location detection.

In this example, the method may infer a level of accumulation and/or type of the radiofrequency transmission affecting elements. The inference may be based on weather forecast. For example, weather forecast may comprise the prediction of snow and the amount of snow which is predicted to fall. In this embodiment, the method may advantageously proactively determine and instruct which one of the at least two nodes to act as a transmitter to transmit the radiofrequency signal for presence and/or location detection and which one of the at least two nodes to act as a receiver to receive the transmitted radiofrequency signal for presence and/or location detection. The determination may also be dependent upon the season of the year, type of the node etc.

In an example, from the images of an optical sensor, e.g. a security camera, the amount of snow fall may be detected on a representative surface in the environment (e.g. in a garden on a car roof). Based on that and based e.g. on the location of the nodes, the snow on the nodes may be detected. In another example, if the node is a lighting device, e.g. an inground fixture, and is covered by a thicker layer of snow or dirt, it will less efficiently radiate heat to the environment due to the thicker snow/dirt on it (as well as more light being reflected by the dirt layer back into the fixture). This leads after switching on of the light in the evening to a different temperature rise of the fixture than for a cleaner fixture. Similarly, a layer of snow or fine dirt will modify the thermal mass differently than layer of loose leaves (the latter still allows the ambient air to be still in good thermal contact with the optical exit window).

In another example, the node e.g. an inground garden spot may have a music speaker and a microphone integrated; depending on the dampening of the audio channel between a first node and a second node, the determination of whether the blocking element is leaves or dirt may be made. Additionally, and/or alternatively the nodes may have a VOC sensor integrated. A decaying layer of dead leaves will emit different VOCs than snow. The node, e.g. the lighting device may feature a structured light sensor, for instance if the node has an integrated smart speaker.

In an embodiment, the method may further comprise adjusting radiofrequency-based sensing quality parameters based on the level of accumulation and/or type of the radiofrequency transmission affecting element, wherein the radiofrequency-based sensing quality parameters comprises one or more of: transmission power, transmission frequency, beamforming of the transmitting- and/or receiving node, the transmission rate of radiofrequency messages from at least one node of the at least two nodes, selection or orchestration of RSSI-based radiofrequency-based sensing and/or CSI-based radiofrequency-based sensing.

The information related to the level of accumulation and/or the type of the radiofrequency transmission affecting element may be comprised in the obtained signal. Additionally, and/or alternatively, the method may comprise detecting the level of accumulation and/or type of radiofrequency transmission affecting element. In addition to reconfiguring the role of transmitter and receiver, the radiofrequency-based sensing quality parameters may be advantageously adjusted to improve radiofrequency-based sensing system.

In an embodiment, at least one of the at least two nodes are lighting devices, wherein the method may further comprise determining and instructing which one of the at least two nodes to act as a transmitter to transmit the radiofrequency signal for presence and/or location detection and which one of the at least two nodes to act as a receiver to receive the transmitted radiofrequency signal for presence and/or location detection based on the type of the lighting device.

In this example, the radiofrequency-based sensing system may comprise lighting devices as nodes. Radiofrequency-based sensing system may comprise other devices such as sensors, actuators etc. together with the lighting devices. In this embodiment, the method may advantageously comprise determining and instructing which one of the at least two nodes to act as a transmitter and which one of the at least two nodes to act as a receiver based on the type of the lighting device. For example, an inground spotlight may be easily getting more soiled than a garden spotlight which may be e.g., 20 cm above the ground. In another example, the amount of H2O condensation occurring on an optical exit window of the lighting device depends strongly on the lighting device type, e.g., on amount of water ingress as well as physical design of the lighting device. Additionally, and/or alternatively, threshold may be selected based on the type of the lighting device.

In an embodiment, the method may further comprise detecting a level of accumulation of the radiofrequency transmission affecting element; wherein the level is detected via a light sensor arranged for detecting a change in light reflections from lighting device optical exit window back into lighting device cavity.

The radiofrequency-based sensing system may comprise a light sensor which may be arranged for detecting an increase in light reflection from the lighting device optical exit window back into in the lighting device cavity. It is known that dirt on the outside of the optical exit window increases light reflections and hence indicates a soiled lighting device glass. An example of such a light sensor may for instance be realized by one or more standard low-power LED in reverse configuration placed upon the lighting device LED L2-board. In an example, an audio sensor may be used such that the reflection of audio may be used to detect a level of accumulation.

In an embodiment, the method may further comprise detecting a level of accumulation of the radiofrequency transmission affecting element and/or a type of the radiofrequency transmission affecting element; and wherein the level and/or type is detected via an optical sensor.

In an example, the method may advantageously use an optical sensor such as a camera to detect a level of accumulation and/or a type of the radiofrequency transmission affecting element.

In an embodiment, the method may further comprise detecting a level of accumulation of the radiofrequency transmission affecting element and/or a type of the radiofrequency transmission affecting element; and wherein the detection of level and/or type of accumulation of the radiofrequency transmission affecting element may be comprising: analyzing a motion trail of a passing person; and inferring, based on the time-sequence of radiofrequency-based sensing system triggers, at least a partial blockage of the radiofrequency sensing system.

For example, when the radiofrequency-based sensing system comprises a plurality of nodes in an environment, the radiofrequency-based sensing system may establish motion trails of a passing person; the time-sequence of radiofrequency-based sensing system triggers along the motion trail may be utilized to infer that a partial RF sensing blockage condition exists for a certain radiofrequency-based sensing pair. For instance, in the case of 10 wireless nodes assembled along a long walking path, the radiofrequency-based sensing system may observe from analyzing the motion trajectory of a person down the path that the fifth pair of nodes has a sensing blind spot and detects the person with a longer detection latency than was previously the case. Assuming that the nodes have not changed in their physical location, the radiofrequency-based sensing system hence can infer that the fifth node may have become at least partially soiled by the radiofrequency transmission affecting element obstructing the wireless multipaths between the two nodes. In an example, baselines of all combination of node pairs may be compared to conclude that only the links involving the nodes of the fifth pair are different from the baseline, which may indicate that that those two have changed. In this example, the results of the sensing algorithm are not compared, but the input to the algorithm (e.g., the time series of RSSI/CSI values) are compared.

In an embodiment, the method may further comprise detecting a level of accumulation of the radiofrequency transmission affecting element; and wherein each of the at least two nodes comprise a wireless antenna and a housing enclosing the wireless antenna, and wherein the level of accumulation of the radiofrequency transmission affecting element is detected via an electrode attached to an inner surface of the housing.

The node may comprise a wireless antenna (or an electrode) and a housing enclosing the wireless antenna. In this example, a simple electrode may be attached to an inner surface of the node housing close by the wireless antenna for radiofrequency-based sensing to measure the self-capacitance of the surface (e.g., glass) and thereby infer the presence of the radiofrequency transmission affecting element such as ice/snow or dirt/debris/leaves attached to the outer surface of the node. In an example, the antenna may be the electrode.

In an embodiment, the method further comprises if the level of accumulation exceeds the threshold, sending an alert to a user about the status of the level of accumulation.

When the node is accumulated with the radiofrequency transmission affecting element and when the level of accumulation exceeds a (predetermined) threshold, the transmission or propagation of radiofrequency signals is adversely affected. This results in an adverse effect not only on the radiofrequency-based sensing but also on network communication such as missing messages, latency etc. Therefore, in this advantageous embodiment, the user is notified if the level of accumulation exceeds the threshold. The radiofrequency-based sensing system may be reconfigured after the cleaning of the at least one of the two nodes have been taken place.

According to a second aspect, the object is achieved by a control device for reconfiguring a radiofrequency-based sensing system comprising at least two nodes, wherein the at least two nodes are arranged for transmitting and/or receiving a radiofrequency signal for presence and/or location detection and for performing network communication in an environment; wherein the control device comprises a processor arranged for executing (at least some of) the steps of the method of the first aspect. The control device may be arranged for controlling e.g., optical sensor, for detecting a level of accumulation and/or type of the radiofrequency transmission affecting element.

According to a third aspect, the object is achieved by a system for reconfiguring a radiofrequency-based sensing system, wherein the system comprises a control device according to the second aspect; and at least two nodes arranged for transmitting and/or receiving a radiofrequency signal for presence and/or location detection and for performing network communication in an environment.

According to a fourth aspect, the object is achieved by a computer program product comprising instructions which, when the program is executed by a computer, cause the computer to carry out the steps of the method of according to the first aspect. It should be understood that the computer program product, the control device and the system may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of systems, devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
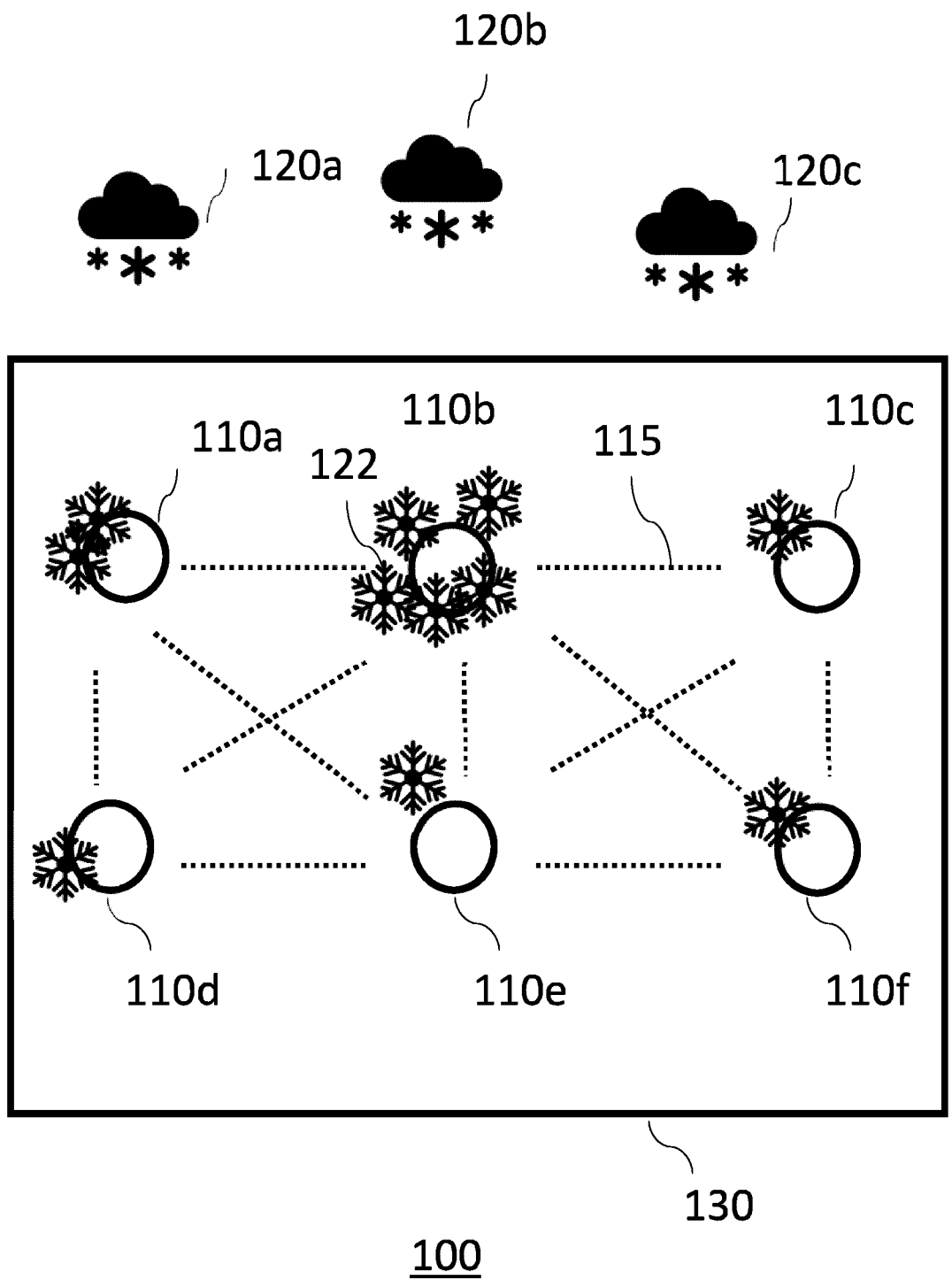
FIG. 1 shows schematically and exemplary an embodiment of a system for reconfiguring a radiofrequency-based sensing system.

FIG. 1 shows schematically and exemplary an embodiment of a system 100 for reconfiguring a radiofrequency-based sensing system in an environment 130. The environment 130 may be an indoor environment such as an animal barn, a warehouse and a manufacturing site. The environment 130 may be an outdoor environment such as a garden, a park etc.

The system 100 comprises at least two nodes 110a-f. The nodes 110a-f are arranged for transmitting and/or receiving a radiofrequency signal for presence and/or location detection and for performing network communication in the environment 130. The system 100 may comprise any number of n nodes, wherein n>1. In an example, the system 100 may comprise three nodes. In this example, one of the three nodes may be assigned the role of a transmitter to transmit the radiofrequency signals and other two of the three nodes may be assigned the role of receiver to receive the transmitted radiofrequency signals. Any number (set) of nodes may be arranged to act as a transmitter node (a transmitter set) and any number (set) of nodes may be arranged to act as a receiver node (a receiver set).

The nodes 110-a-f may be arranged to communicate in a star network topology or in a mesh network topology. In a star network, a central controller has a direct wireless communication path to every node in the network. In a mesh network, the nodes 110a-f does in general not communicate directly with the central controller, but via so-called multi-hop communications. In a multi-hop communication, a data packet is transmitted from a sender node to a destination node via one or more intermediate nodes. Nodes act as routers to transmit data packets from neighboring nodes to nodes that are too far away to reach in a single hop, resulting in a network that can span larger distances. FIG. 1 exemplary shows a mesh network wherein the nodes 110a-f may be arranged for communicating with the neighboring nodes 110a-f via a communication path as shown by the dotted lines 115.

The at least one of the at least two nodes 110a-f may be lighting devices. For example, the environment 130 is a garden and the nodes are the lighting devices arranged for illuminating the garden. An example of a lighting device is exemplary and schematically shown in FIG. 2.

Figure 2:
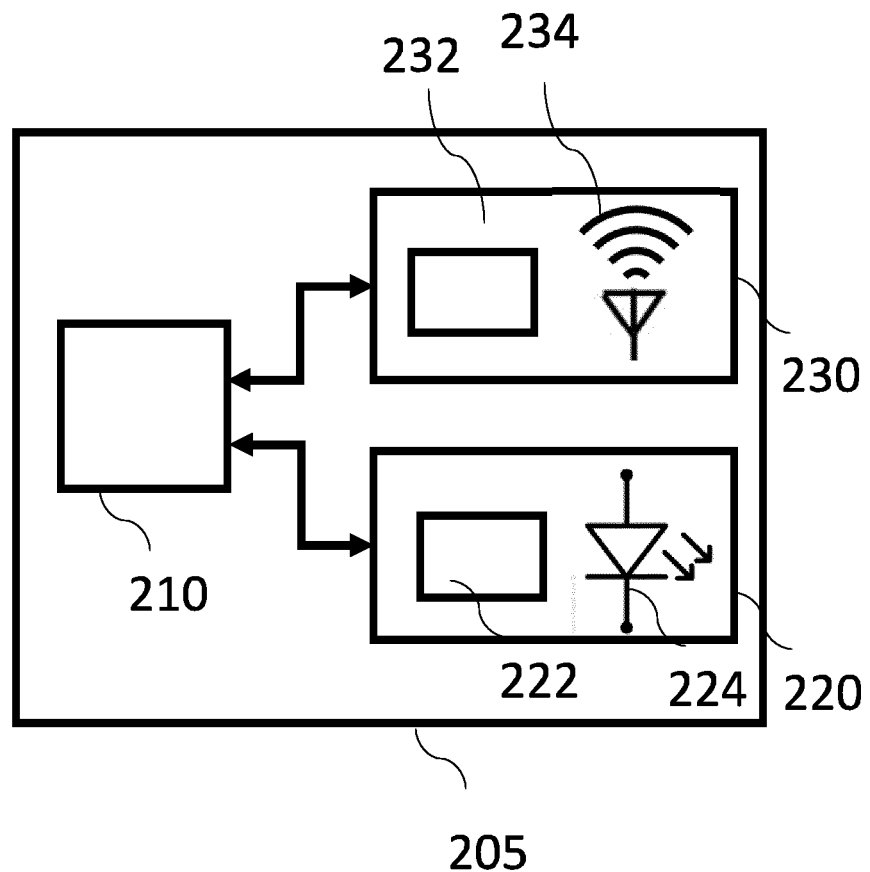
FIG. 2 shows schematically and exemplary an embodiment of a lighting device for the system for reconfiguring a radiofrequency-based sensing system.

Now referring to FIG. 2, the lighting device 200 comprises a processor 210, a light illumination module 220 and a communication module 230 enclosed in a housing 205. A lighting device 200 is a device or structure arranged to emit light suitable for illuminating an environment, whereas the light is providing or substantially contributing to the illumination on a scale adequate for that purpose.

The processor 210 is arranged for communicating with and controlling the light illumination module 220 and the communication module 230. The communication module 230 comprises a wireless antenna 234 and a wireless transceiver 232 which is arranged for communicating over radiofrequency, using a protocol such as Wi-Fi, Bluetooth or Zigbee. The communication module 230 is arranged for transmitting and/or receiving a radiofrequency signal for presence and/or location detection and for performing network communication in an environment 130. The lighting illumination module 220 comprises at least one light source 224 or lamp, such as an LED-based lamp, gas-discharge lamp or filament bulb and a light source driver such as an LED driver 222 arranged for deriving the light source load 224 such as an LED load. Although, in this exemplary figure, no communication link is shown between the communication module 230 and the lighting illumination module 220. A communication path may exist between the communication module 230 and the lighting illumination module 220.

Each of the lighting device 200 may take any of a variety of forms, e.g., a ceiling mounted lighting device, a wall-mounted lighting device, a wall washer, or a free-standing lighting device, a garden lighting device, an inground lighting device, a spot lighting device (and the lighting device need not necessarily all be of the same type) etc.

Now referring back to FIG. 1. Snow clouds 120a-c are exemplary shown in FIG. 1 to illustrate a weather condition. In case of heavy snow, snowflakes 122 may be accumulated in proximity of the lighting devices 110a-f, 200. The level of accumulation of the radiofrequency transmission affecting elements 122 such as snowflakes 122 may be different on different lighting devices 110a-f, 200. The level of accumulation may be based on the spatial location of the lighting device 110a-f, 200. In another example, any radiofrequency transmission affecting elements 122, besides snow, such as mud, debris, dirt, leaves etc. may also be accumulated in proximity of the lighting device 110a-f, 200. It is known in the art that dirt and debris in proximity of the node e.g., on the wireless transceiver 232, may impact the quality of signals emitted for radio communications. For instance, for satellite dishes it is recommended to remove any larger debris such as leaves, bird droppings, or top layers of dirt and pollen to maximize the X- and Ku-band wireless signal reflected from the dish antenna to the satellite receiver unit mounted above it. The radiofrequency communication is also attenuated by (dead) or wet leaves.

Figure 4:
FIG. 4 shows another example of a lighting device with accumulation of radiofrequency transmission affecting elements.

In addition to mud, dust, debris, snow etc. the propagation of radiofrequency signals may also be impacted if a top layer of water or ice is formed on a node 110a-f such as on a lighting device 200. It is well known that glass surfaces like car windows and the optical exit windows of lighting devices 200 cool down quicker during the night than other objects, hence leading to more water condensation compared to other surfaces. Condensation may occur not only on the outwards-facing surface of the optics but also on the inside-facing surface of the lighting device 110a-f. When the temperature inside the mechanically sealed garden light fixture 200 drops fast, the relative humidity inside the lighting device enclosure/housing 205 will increase as the excess water vapor inside the lighting device 200 cannot be fast enough exchanged with the environment 130 outside of the lighting device 200. This humidity increase is because the water vapor exchange from the inside of an outdoor lighting device 200 to the free air is per-design restricted (since the garden lighting device 200 has to be IP66 rated). The amount of condensation inside the lighting device 200 depends on the total volume of the lighting device enclosure/housing 205 and the experienced ambient temperature drop. The water condensation will take place on the area(s) with the lowest temperature, which is usually is the mechanical lighting device part in direct contact with the ambient air. In the case of an inground lighting device 400, the coldest spot will hence always be the glass optics as exemplary shown in FIG. 4. Consequently, the cold-spot condensation will strongly affect the most prominent wireless path from a wireless antenna 224 inside the lighting device 200 to the outside world.

The amount of condensation occurring inside the fixture will also depend on the amount of water ingress the lighting device 200 has experienced. In practice, water ingress will slowly occur to some extent for all outdoor lighting devices 200. However, the water ingress will vary greatly between individual lighting devices 200. Consequently, there will be a difference in water ingress even for two lighting devices 200 of the same precise model located in the same garden. These differences in water ingress in practice lead that lighting devices 200 have very different severity of water condensation inside the fixture.

Although the lighting device's 200 inside is mechanically sealed against the outdoor environment, it is known that unexpected pressure differentials between the inside of the lighting device 200 and the outside environment can occur. For instance, a quick drop in the outside temperature (e.g., during a thunderstorm) is known to create a vacuum of 0.5 psi or greater inside the lighting device enclosure/housing 205. When a vacuum occurs, water and other radiofrequency transmission affecting elements can be sucked from the exterior of the fixture into the housing 205. In practice, the ingress of water and contaminants will vary depending on how the seals for the specific lighting device 200 are precisely placed with respect to the metal lighting device housing 205 and hence consequently, the total amount of water and other radiofrequency transmission affecting elements which got sucked into an outdoor lighting device 200 will greatly vary from lighting device 200 to lighting device 200. Hence, a first lighting device 200 inside may have little contamination on its antenna PCB, while the antenna PCB inside a second lighting device 200 may be very soiled by foreign objects carried by the dirty water.

The radiofrequency transmission affecting elements 122 may accumulate either rapidly (e.g., snow, condensation) or accumulate slowly over a prolonged period of time. For instance, a garden light may also be slowly soiled by a top layer of garden dirt and/or green deposits/algae/moss growth. In addition, also dead insects are known to slowly collect on lighting devices 110*a-f*, 200, especially if there is decaying organic matter or a puddle of stagnant water close by to the lighting devices 110*a-f*, 200. In some cases, insects may even be able to enter the inside of the lighting devices 110*a-f*, 200 and eventually die due to heat/starvation, leading over the years to more radiofrequency transmission affecting element 122 directly accumulating on the bottom of the lighting devices 110*a-f*, 200 (where usually the wireless antenna 234 and light source 224 such as LEDs are located).

The top layer of garden soil on the lighting devices 110*a-f*, 200 may act like a thin sponge sucking up the rainwater; hence after it has rained, the top layer will stay humid for a longer period after the rain, impacting the wireless transmissions of the in-ground spot, most severely for higher WiFi frequencies. Similarly, during a cold night, a condensed-water top layer or ice top layer may form on the lighting device's 110*a-f*, 200 optical exit windows. Cold-spot condensation may occur both on the outwards-facing surface of the lighting device 110*a-f*, 200 optics but also on its inside-facing glass surface. This cold-spot condensation top layer will affect the most prominent wireless path from the wireless antenna 234 via the glass window to the outside environment 130 and will vary greatly between individual fixtures. The presence and amount of condensation will also vary depending on environmental conditions (ambient temperature etc.).

The radiofrequency-based sensing may also be affected by dead leaves or snow accumulations directly on the garden lighting device 110*a-f*, 200 (or in its immediate vicinity). These piles of radiofrequency transmission affecting elements 122 may be accumulated through wind or human action (e.g., snow shoveling, brooming of leaves from the walk path etc.). If any radiofrequency transmission affecting elements 122 such as dirt/ice/snow/leaves is accumulating at a short distance from the wireless antenna 234, the radiofrequency-based sensing will be distorted due to the wireless antenna 234 becoming detuned by the radiofrequency transmission affecting elements 122.

Figure 3:
FIG. 3 shows an example of a lighting device with accumulation of radiofrequency transmission affecting elements.

FIG. 3 shows an example of a lighting device 300 with accumulation of radiofrequency transmission affecting elements 122. The lighting device 300 is lighting device used in an animal barn which is severely affected by dirt during normal use. Lighting devices 300 in barns are known to be very prone to dirt and dust accumulation; for instance, when pigs poop, they are known to shake their tails and kick up excrements; similarly, when pressure cleaning of the livestock barn floor is performed, it kicks up faeces to the lighting devices 300; while pressure cleaning the floor, the lighting device 300 may not always be equally diligently cleaned by the farm worker to the cleanliness extent required for (advanced) radiofrequency-based sensing features (for example, this may be the case as it is harder for the worker to examine the cleanliness of a ceiling lighting device 300 suspended from the ceiling than examining the cleanliness of the floor; similarly, the worker may consider only the cleanliness of the floor as important as a clean floor is directly tightly linked to animal health).

Figure 5:
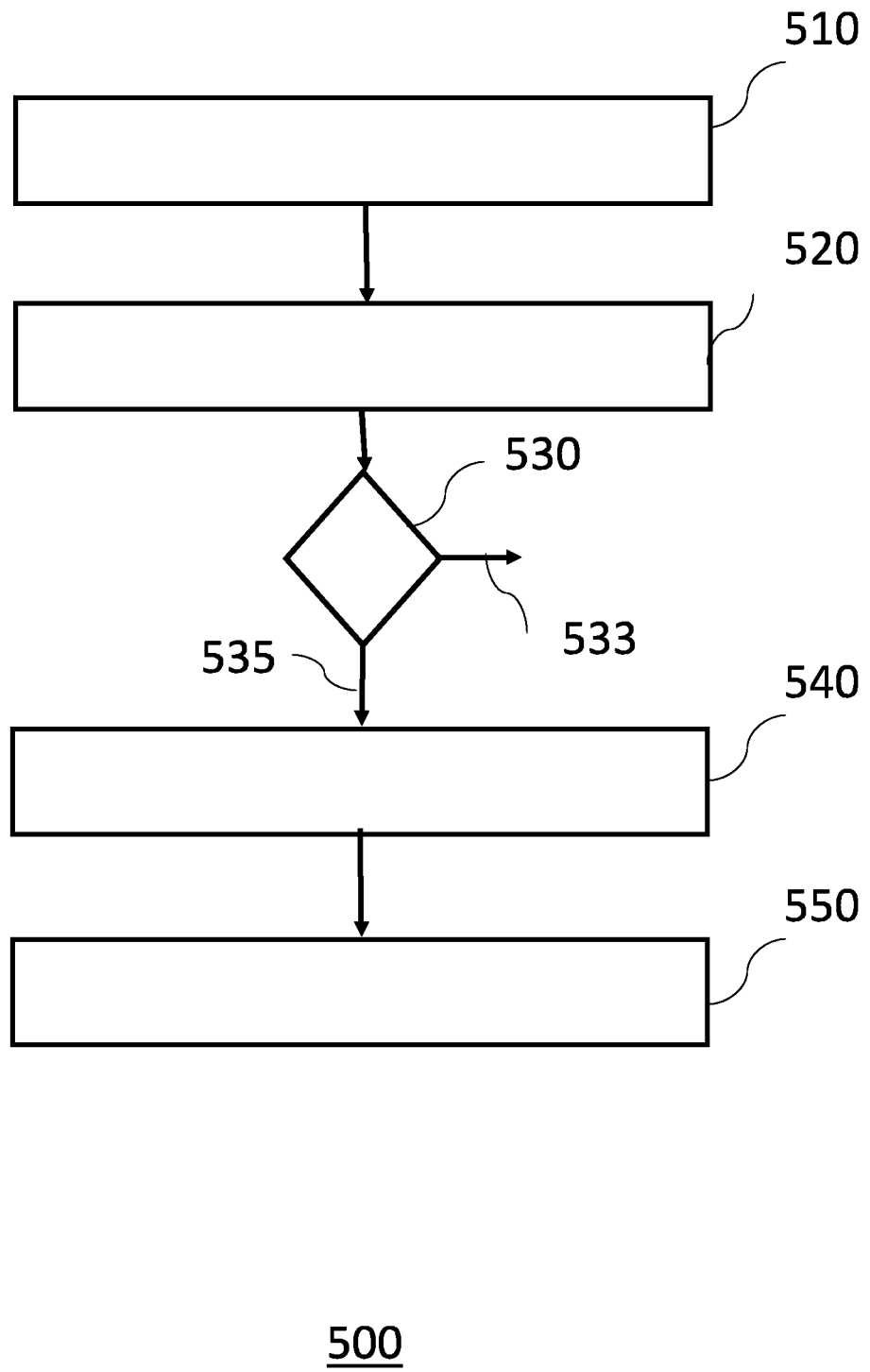
FIG. 5 shows schematically and exemplary a flowchart illustrating an embodiment of a method for reconfiguring a radiofrequency-based sensing system.

FIG. 5 shows schematically and exemplary a flowchart illustrating an embodiment of a method 500 for reconfiguring a radiofrequency-based sensing system 100 comprising at least two nodes 110*a-f*. Each of the at least two nodes 110*a-f* may be arranged for transmitting and/or receiving a radiofrequency signal for presence and/or location detection and for performing network communication in an environment 130. The network communication may comprise any wireless communication protocol such as Wifi, Zigbee etc. and the nodes 110*a-f* may be equipped with the modules required for the wireless communication protocol. The radiofrequency signals used for network communication may be used for radiofrequency-based sensing. The radiofrequency-based sensing uses the principle that any movement of a water body (e.g., human, animal etc.) within the environment 130 will affect the propagation of the radiofrequency signals. Such an affect can be characterized to at least sense a presence of a user. Further application of radiofrequency-based sensing comprises location detection, gesture detection, breathing detection which are not excluded from the scope of this invention.

The method 500 may comprise obtaining 510 a signal indicative of a level of accumulation of the radiofrequency transmission affecting elements in proximity of at least one of the at least two nodes. The signal may be indicative of the level of accumulation in proximity of each of the at least two nodes. The obtained signal may be indicative of a current level of accumulation of the radiofrequency transmission affecting elements and/or a future predicted level of accumulation of the radiofrequency transmission affecting elements. The level of accumulation may comprise a measurement of how much the accumulation is in proximity and/or it may simply be an indication of an (qualitative/quantitative) effect of such a radiofrequency transmission affecting elements on the transmission of the radiofrequency signals.

In an embodiment, the obtained signal further comprises information indicative of a current type of the radiofrequency transmission affecting element and/or a future predicted type of the radiofrequency transmission affecting element. Additionally, and/or alternatively, the method may comprise detecting a current level of accumulation of radiofrequency transmission affecting elements and/or predicting/inferring a future level of accumulation of radiofrequency transmission affecting elements. Further additionally, and/or alternatively, the method may comprise detecting a current type of accumulation of radiofrequency transmission affecting elements and/or predicting/inferring a future type of accumulation of radiofrequency transmission affecting elements.

Various detection mechanism may be used. For example, an optical sensor, such as a camera may be used for said detection. Additionally, and/or alternatively, a change in reflection of light from lighting device optical exit window back into lighting device cavity may also be used for the detection. Furthermore, an effect on a motion trail of a person using radiofrequency-based sensing may also indicate the presence of radiofrequency transmission affecting elements. Any other method known in the art for such a detection is not excluded from the scope of the invention.

The method 500 may further comprise determining 520 whether the level of accumulation exceeds a threshold. The threshold may be predetermined. In an embodiment, the threshold is selected based on the current and/or future predicted type of the radiofrequency transmission affecting element. Additionally, and/or alternatively, the threshold may be selected based on the type of the lighting devices 110a-f, 200, placement of the lighting devices 110a-f, 200 in the environment 130, mounting height and/or orientation of the lighting devices 110a-f, 200, the network connection history of the lighting devices 110a-f, 200, reachability of the lighting devices 110a-f, 200, and other parameters affecting the network communication function of the lighting devices 110a-f, 200, number of the lighting devices 110a-f, 200 in the environment to perform network communication and/or radiofrequency-based sensing, time/season of the year, type of the environment 130, application of radiofrequency-based sensing e.g. presence detection, gesture detection etc.

The method 500 may further comprise a condition that if the level of accumulation exceeds 535 the threshold; determining 540, based on the obtained signal, which one of the at least two nodes to act as a transmitter to transmit the radiofrequency signal for presence and/or location detection and which one of the at least two nodes to act as a receiver to receive the transmitted radiofrequency signal for presence and/or location detection. When the level of accumulation does not exceed 533 the threshold, the radiofrequency-based sensing system may keep the configuration.

When the impact of the radiofrequency transmission affecting element on the transmission/propagation of the radiofrequency signals exceeds a (predetermined) threshold such that the transmission is adversely affected, which may be analyze for instance via a poor network communication such as missing or delayed radiofrequency messages or via a poor radiofrequency sensing such as false positives or false negatives, the method 500 may be then comprising determining 540, based on the obtained signal, which one of the at least two nodes to act as a transmitter to transmit the radiofrequency signal for presence and/or location detection and which one of the at least two nodes to act as a receiver to receive the transmitted radiofrequency signal for presence and/or location detection.

For example, the at least two nodes may comprise a first node 110a-f and a second node 110a-f. The method 500 may further comprise comparing the level of accumulation of the radiofrequency transmission affecting elements 122 in proximity of the first 110a-f and the second node 110a-f. The comparison in the simplest term comprises which of the first 110a-f and the second node 110a-f is more adversely affected (dirtier) by the radiofrequency transmission affecting element 122. The method 500 may further comprise determining and instructing the first node 110a-f to act as a receiver to receive the transmitted radiofrequency signal for presence and/or location detection if the level of accumulation for the first node 110a-f is higher compared to the second node 110a-f.

In the simplest setting, when only two nodes 110a-f are present. The determining 540 comprises switching the role of the two nodes 110a-f. In another example, a typical RF sensing setup in a garden consists of at least three nodes 110a-f such as lighting devices 110a-f, 200 with one radiofrequency-based sensing transmitter lighting device 110a-f, 200 (TX1) and two radiofrequency-based sensing receiving lighting device 110a-f, 200 (RX1, RX2). The accumulation of the radiofrequency transmission affecting element 122 on the transmitter lighting device 110a-f, 200 (TX1) will affect the radiofrequency-based sensing for both the radiofrequency-based sensing link between the TX1 and RX1 as well as the radiofrequency sensing link between the TX1 and the RX2. On the other hand, if the radiofrequency transmission affecting element 122 is at one of the receiver lighting device 110a-f, 200 (RX1 or RX2), the radiofrequency transmission affecting element 122 will only interact with the wireless multipaths between the TX1 and RX1 but not negatively affect the wireless multipaths between the clean TX1 and clean RX2. Consequently, it is advantageous to assign in a radiofrequency-based sensing system the dirtier node to act as a radiofrequency-based sensing receiver rather than allowing them to also play the transmitter role.

The method 500, additionally, and/or alternatively, may comprise determining and instructing which one to act as a transmitter and/or receiver for presence and/or location detection based on the type of radiofrequency transmission affecting element 122. Since, the effect of different types of the radiofrequency transmission affecting elements 122 is different on the transmission of the radiofrequency signal, e.g., wet snow will have a stronger effect than dry leaves, the method may determine which one to act as a transmitter and/or receiver based on the type of radiofrequency transmission affecting element 122. For example, in the same environment 130, a node 110a-f covered with wet snow may be assigned the role of a receiver than a transmitter and a node 110a-f covered with dry leaves may be assigned the role of a transmitter. It is obvious to note that the level of accumulation for the specific type of the radiofrequency transmission affecting element 122 should be sufficiently high to start interrupting the radiofrequency signal transmission.

In an example, the method may further comprise inferring a level of accumulation of the radiofrequency transmission affecting elements 122 in proximity of at least one of the at least two nodes 110a-f and/or type of radiofrequency transmission affecting elements 122 based on weather forecast. The level and/or accumulation may be predicted based on one or more of weather forecast, season of the year, type of the node, location of the node in the environment. With a prediction of snow and the predicted level of snow, the method 500 may comprise (proactively) determining, based on inferred level of accumulation of the radiofrequency transmission affecting elements 122 and/or on inferred type of the radiofrequency transmission affecting element 122, which one of the at least two nodes 110a-f to act as a transmitter to transmit the radiofrequency signal for presence and/or location detection and which one of the at least two nodes 110a-f to act as a receiver to receive the transmitted radiofrequency signal for presence and/or location detection.

In an example, the method 500 may further comprise adjusting radiofrequency-based sensing quality parameters based on the level of accumulation and/or type of radiofrequency transmission affecting element, wherein radiofrequency-based sensing quality parameters may comprise any one or more of: transmission power, transmission frequency, beamforming of the transmitting- and/or receiving node, the transmission rate of radiofrequency messages from at least one node of the at least two nodes, selection or orchestration of RSSI-based radiofrequency-based sensing and/or CSI-based radiofrequency-based sensing.

The transmission frequency may also comprise a sequence of transmission frequencies. Radiofrequency-based sensing system may utilize a change in the received signal strength indicator (RSSI) with respect to a baseline as an indication of a detection an event (e.g. presence) and/or can utilize multipath information (CSI) for detecting an event. The method 500 may choose between using RSSI-based radiofrequency-based sensing and/or CSI-based radiofrequency-based sensing based on the level of accumulation and/or type of the radiofrequency transmission affecting elements 122. In an example, many radiofrequency-based sensing applications for manufacturing sites and warehouse require detection of sensing events at large distances. For instance, in smart warehouses handwaving gestures by an employee are used for stopping a robot; hence the "stop" gesture should be detected by the radiofrequency sensing system e.g., at 10 m distance. However, for radiofrequency-sensing-based gesture recognition to be performed at large distance requires an excellent S/N ratio. Hence, in addition to reconfiguring role of the transmitter and/or receiver of the nodes, also the transmit power or beamforming of the transmitting- and/or receiving nodes may be automatically adjusted based on the detection of the radiofrequency transmission affecting elements 122 in proximity of the nodes 110a-f.

The determining 540 is based on the obtained signal. The obtained signal may be indicative of the type of radiofrequency transmission affecting elements 122. The determining 500 may be then based on the type of radiofrequency transmission affecting elements 122. The determining 500 may be based on the level of radiofrequency transmission affecting elements 122 such as how much dirty a node is and decides based on which node to act as a transmitter or receiver.

The method 500 may further comprise instructing 550 the determined one of the at least two nodes to act as a transmitter and the determined one of the at least two nodes to act as a receiver. It is worth noting that the roles of transmitter and receiver discussed herewithin only apply to the radiofrequency-based sensing function. The radiofrequency-sensing nodes, which are typically communication nodes of a wireless communication network are capable of dynamically changing the roles of transmitter and receiver for performing the communication function. For instance, once a transmitter-receiver pair and the respective roles have been assigned, the radiofrequency-sensing nodes may continue to perform the intended communication function, but only those radiofrequency signals provided by the radiofrequency-sensing node having the transmitter function assigned to and received by the radiofrequency-sensing node having the receiver function assigned to will be used for the radiofrequency sensing function. As the level of accumulation may vary over time or the type of accumulation be different at different times/seasons, the method may comprise reconfiguring the radiofrequency-based sensing system dynamically over time.

Figure 6:
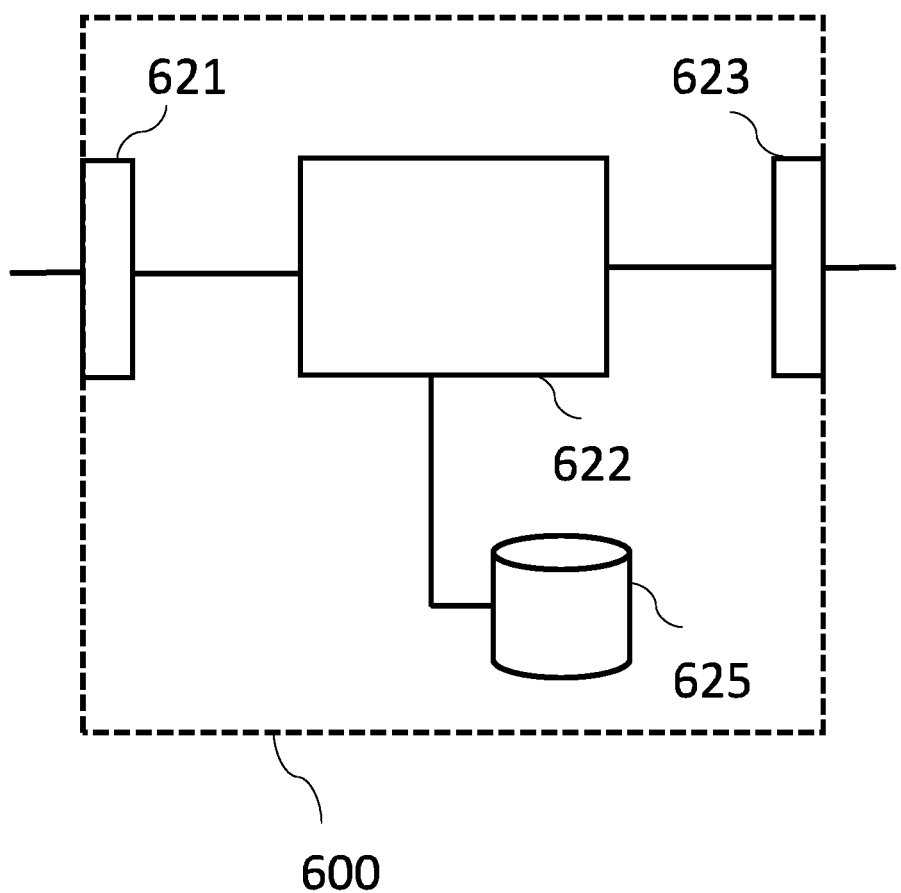
FIG. 6 shows schematically and exemplary an embodiment of a control device for reconfiguring a radiofrequency-based sensing system.

FIG. 6 shows schematically and exemplary an embodiment of a control device 600 for reconfiguring a radiofrequency-based sensing system. The control module 600 may comprise a processor 622, for instance, to execute at least some of the steps of the method 500. The processor 622 may be configured to control the detecting of the level of accumulation and/or type of the radiofrequency transmission affecting elements 122. The control module 600 may further comprise an input unit 621 and an output unit 623. The input 621 and the output 623 units may be comprised in a transceiver (not shown) arranged for receiving (input unit 621) and transmitting (output unit 623) communication and/or control signals. The communication/control signals may be used for communicating with the at least two nodes 110a-f. The control module 600 may comprise a memory 625, which may be arranged for storing e.g., a list of addresses of the at least two nodes 110a-f. The memory 625 may be one or more of random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs). The processor 622 may be arranged for retrieving the list from the memory 625.

The control device 600 may be implemented in a unit separate from the at least two nodes 110a-f, such as wall panel, desktop computer terminal, or even a portable terminal such as a laptop, tablet or smartphone. Alternatively, the control device 600 may be incorporated into the same unit as the node 110a-f. Further, the control device 600 may be implemented in the environment 130 or remote from the environment 130 (e.g. on a server of the building or at a different geographical site); and the control device 600 may be implemented in a single unit or in the form of distributed functionality distributed amongst multiple separate units (e.g. a distributed server comprising multiple server units at one or more geographical sites, or a distributed control function distributed amongst the at least two nodes 110a-f). Furthermore, the control device 600 may be implemented in the form of software stored on a memory (comprising one or more memory devices) and arranged for execution on a processor (comprising one or more processing units), or the control device 600 may be implemented in the form of dedicated hardware circuitry, or configurable or reconfigurable circuitry such as a PGA or FPGA, or any combination of these.

Regarding the various communication involved e.g., to enable the control device 600 to communicate e.g., with the at least two nodes 110a-f, these may be implemented in by any suitable wireless means, e.g., by means a wireless network such as a local (short range) radiofrequency network, e.g., a Wi-Fi, ZigBee or Bluetooth network; or any combination of these and/or other means.

The method 500 may be executed by computer program code of a computer program product when the computer program product is run on a processing unit of a computing device, such as the processor 622 of the system 100.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of reconfiguring a radiofrequency-based sensing system having at least two nodes, the at least two nodes being arranged for transmitting and/or receiving a radiofrequency signal for presence and/or location detection and for performing network communication in an environment, the method comprising:
    obtaining a signal indicative of a level of accumulation of radiofrequency transmission affecting elements in proximity of at least one of the at least two nodes, the propagation of the radiofrequency signal being adversely affected by the radiofrequency transmission affecting elements, and the radiofrequency transmission affecting elements being accumulated on the surface of the at least one of the at least two nodes;
    determining whether the level of accumulation exceeds a threshold; and
    when the level of accumulation exceeds the threshold, the method further comprising:
        determining, based on the obtained signal, which one of the at least two nodes to act as a transmitter to transmit the radiofrequency signal for presence and/or location detection and which one of the at least two nodes to act as a receiver to receive the transmitted radiofrequency signal for presence and/or location detection, and
        instructing the determined one of the at least two nodes to act as a transmitter and the determined one of the at least two nodes to act as a receiver.

2. The method according to claim 1, wherein the obtained signal is further indicative of a type of radiofrequency transmission affecting element, and wherein the method further comprises:
    selecting the threshold based on the type of radiofrequency transmission affecting element.

3. The method according to claim 1, wherein the at least two nodes comprise a first node and a second node, and wherein the obtained signal is indicative of the level of accumulation and/or a type of radiofrequency transmission affecting element in proximity of the first node and the second node; and wherein the method further comprises:
    comparing the level of accumulation of the radiofrequency transmission affecting elements in proximity of the first and the second node,
    determining and instructing the first node to act as a receiver to receive the transmitted radiofrequency signal for presence and/or location detection if the level of accumulation for the first node is higher compared to the second node; and/or
    determining and instructing which one to act as a transmitter and/or receiver for presence and/or location detection based on the type of the radiofrequency transmission affecting element.

4. The method according to claim 1, wherein the method further comprises reconfiguring the radiofrequency-based sensing system dynamically over time.

5. The method according to claim 1, wherein the method further comprises:
    inferring a level of accumulation of the radiofrequency transmission affecting elements in proximity of the at least one of the at least two nodes and/or type of the radiofrequency transmission affecting elements based on one or more of weather forecast, season of the year, type of the node, location of the node in the environment, real-time camera image of a representative surface, the audio sound propagation, a VOC sensor reading, a structured light sensor; and
    determining, based on the inferred level of accumulation of the radiofrequency transmission affecting elements and/or on the inferred type of the radiofrequency transmission affecting element, which one of the at least two nodes to act as a transmitter to transmit the radiofrequency signal for presence and/or location detection and which one of the at least two nodes to act as a receiver to receive the transmitted radiofrequency signal for presence and/or location detection.

6. The method according to claim 1, wherein the method further comprises:
    adjusting radiofrequency-based sensing quality parameters based on the level of accumulation and/or type of the radiofrequency transmission affecting element, wherein the radiofrequency-based sensing quality parameters comprises one or more of: transmission power, transmission frequency, beamforming of the transmitting- and/or receiving node, the transmission rate of radiofrequency messages from at least one node of the at least two nodes, selection or orchestration of RSSI-based radiofrequency-based sensing and/or CSI-based radiofrequency-based sensing.

7. The method according to claim 1, wherein at least one of the at least two nodes are lighting devices, wherein the method further comprises:
   determining and instructing which one of the at least two nodes to act as a transmitter to transmit the radiofrequency signal for presence and/or location detection and which one of the at least two nodes to act as a receiver to receive the transmitted radiofrequency signal for presence and/or location detection based on the type of the lighting device.

8. The method according to claim 7, wherein the method further comprises detecting a level of accumulation of the radiofrequency transmission affecting element; wherein the level is detected via a light sensor arranged for detecting a change in light reflections from lighting device optical exit window back into lighting device cavity.

9. The method according to claim 1, wherein the method further comprises detecting a level of accumulation of the radiofrequency transmission affecting element and/or a type of radiofrequency transmission affecting element;
   and wherein the level and/or type is detected via an optical sensor.

10. The method according to claim 1, wherein the method further comprises detecting a level of accumulation of the radiofrequency transmission affecting element and/or a type of the radiofrequency transmission affecting element;
   and wherein the detection of level and/or type of accumulation of the radiofrequency transmission affecting element comprising:
   analyzing a motion trail of a passing person;
   inferring, based on the time-sequence of radiofrequency-based sensing system triggers, at least a partial blockage of the radiofrequency sensing system.

11. The method according to claim 1, wherein the method further comprises detecting a level of accumulation of radiofrequency transmission affecting element; and wherein each of the at least two nodes comprise a wireless antenna and a housing enclosing the wireless antenna, and wherein the level of accumulation of radiofrequency transmission affecting element is detected via an electrode attached to an inner surface of the housing.

12. The method according to claim 1, wherein the method further comprises if the level of accumulation exceeds the threshold, sending an alert to a user about the status of the level of accumulation.

13. A control device for reconfiguring a radiofrequency-based sensing system comprising at least two nodes, wherein the at least two nodes are arranged for transmitting and/or receiving a radiofrequency signal for presence and/or location detection and for performing network communication in an environment;
   wherein the control device comprises a processor arranged for executing the steps of the method of claim 1.

14. A system for reconfiguring a radiofrequency-based sensing system, wherein the system comprises:
   a control device according to claim 13; and
   at least two nodes arranged for transmitting and/or receiving a radiofrequency signal for presence and/or location detection and for performing network communication in an environment.

15. A non-transitory computer readable medium comprising computer program code instructions which, when executed by a processor, carry out the method of claim 1.

* * * * *